United States Patent Office 2,737,761
Patented Mar. 13, 1956

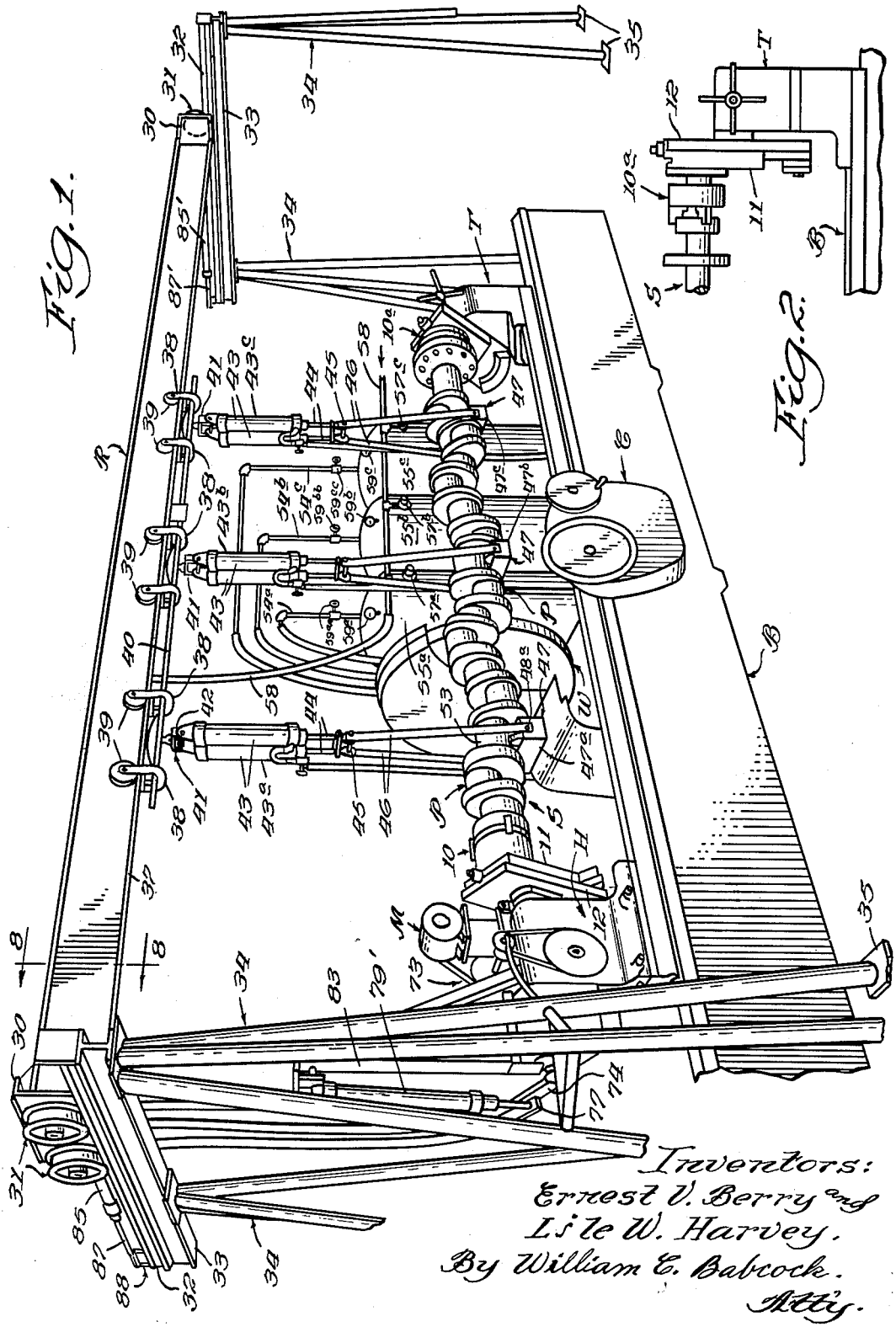

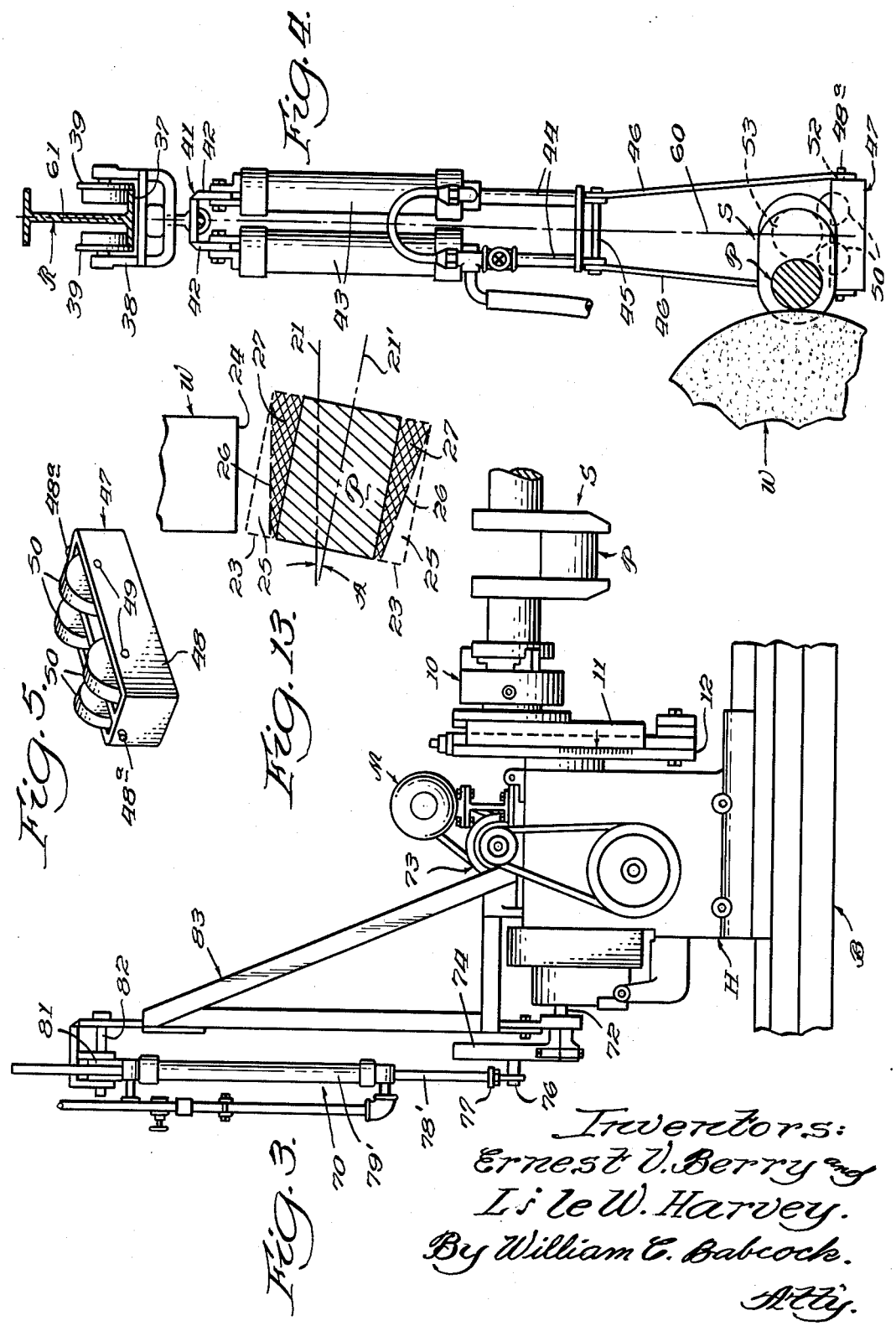

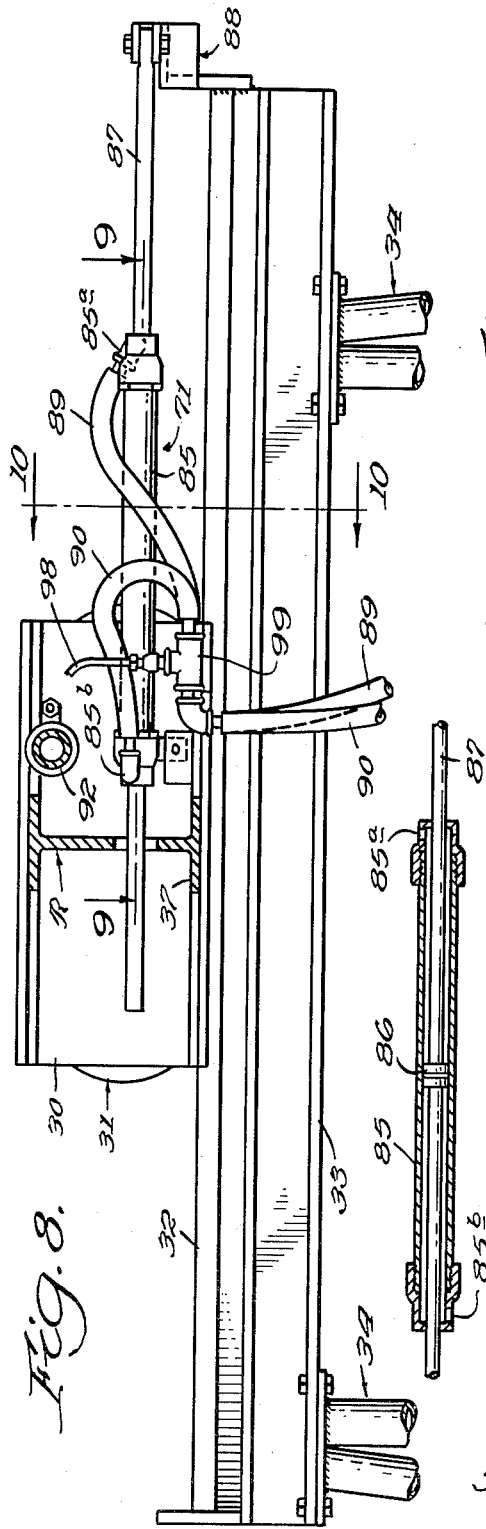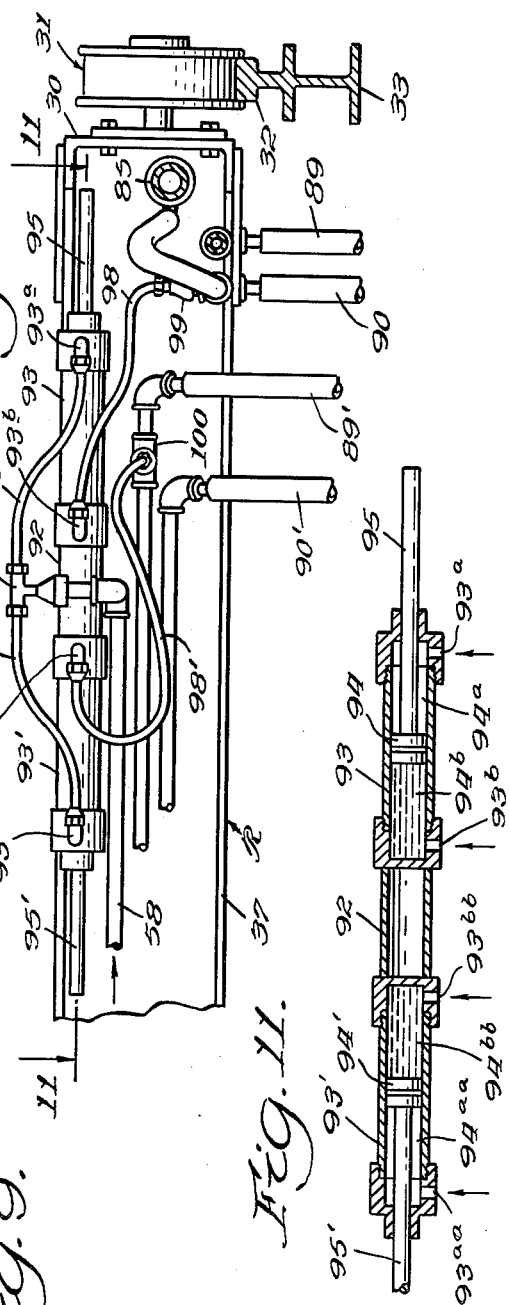

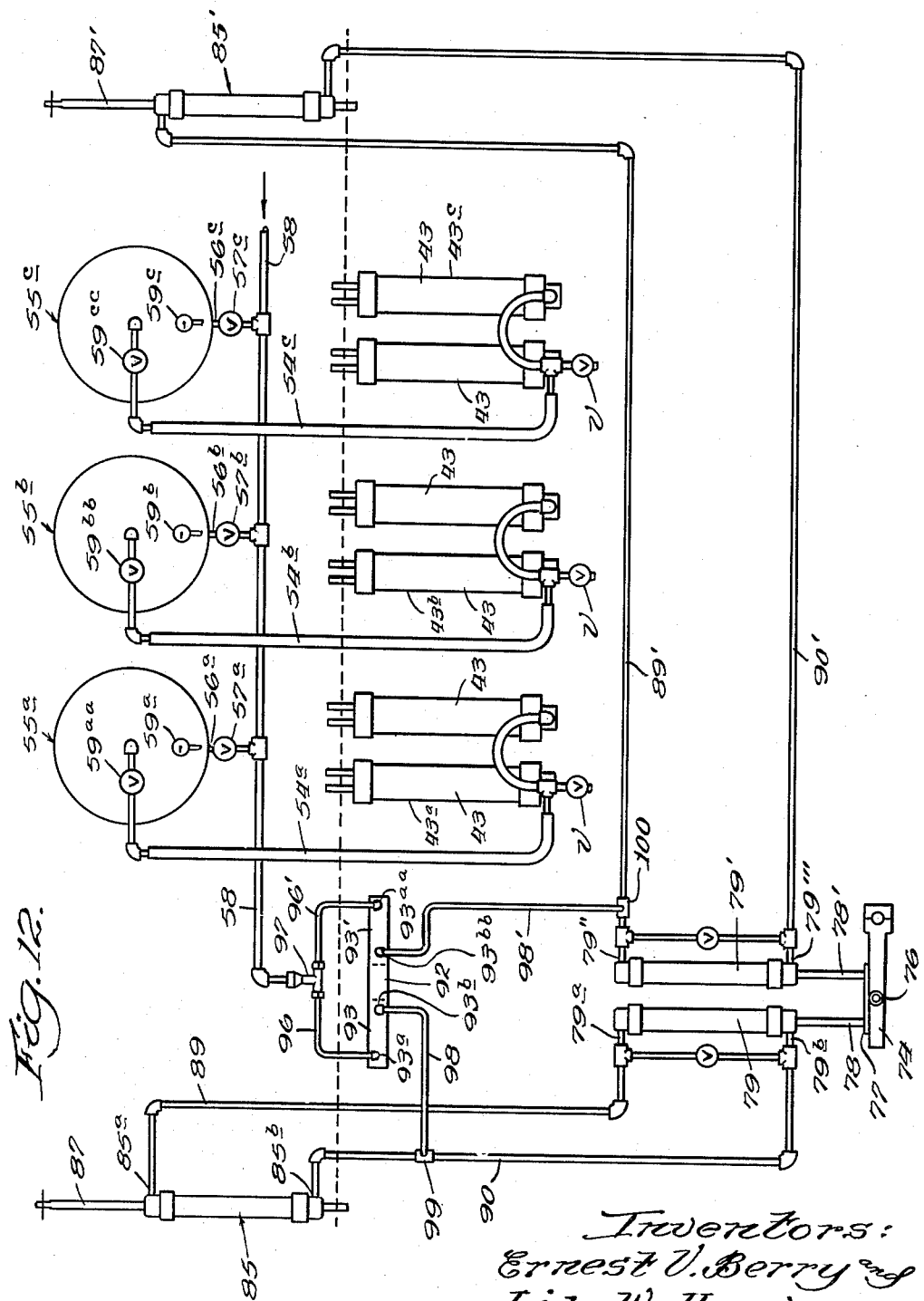

2,737,761
APPARATUS AND METHOD FOR SUPPORTING A DEFORMABLE MEMBER WHILE IT IS BEING WORKED

Ernest V. Berry and Lile W. Harvey, Los Angeles, Calif.; said Harvey assignor to said Berry Application May 11, 1953, Serial No. 354,318

23 Claims. (Cl. 51—237)

Our invention relates to the general field of work-supporting devices, and more particularly to an apparatus for maintaining an elongate member, such as a crankshaft or the like, in a rotatably balanced, non-distorted position to permit accurate machining of parts thereof; the method of so supporting an elongate member; and an article of manufacture, including surfaces thereof, formed by means of said method.

One problem frequently encountered in the maintenance of mechanical equipment is that of reconditioning the worn crank pins and main journals of crankshafts. Although it has long been recognized that considerable financial savings could be achieved by the satisfactory reconditioning of large crankshafts such as used in Diesel locomotives, no reliable method or apparatus for accomplishing this work has previously been available.

The chief disadvantages of former apparatus have been the very high initial cost thereof, and the heavy, cumbersome structure of such apparatus in order for it to support the full weight of a crankshaft disposed between the throwheads, as well as that of the counterweights employed with the throwheads during machining of the crankshaft.

A further disadvantage of previously available apparatus of this nature has been the great difficulty encountered in maintaining the crankshaft in balance and in a non-distorted position during rotation, even with the assistance of heavy counterweights carefully adjusted on the throwheads for maintaining the crankshaft in a rotatably balanced condition.

A major object of our invention is to furnish an apparatus and method for maintaining elongate members in a rotatably balanced, non-distorted horizontally disposed position by placing work supports at selected positions along the length thereof, urging each of said supports upwardly with a force sufficient to float said member in mid-air, and rotating the ends of said member by means not supporting the weight of said member.

Another object of our invention is to provide an apparatus of simplified mechanical structure that may be relatively light in weight inasmuch as the tail stock and head stock thereof do not support the member on which work is being performed, but merely serve to rotate the ends of the member through a predetermined annular path.

A further object of our invention is to provide an apparatus embodying work supports which are laterally reciprocated with the desired throw in synchronism with the rotation of the member being machined, whereby a substantially vertical, upwardly directed force is constantly maintained on the supports.

Yet another object of our invention is to provide an apparatus in which the work supports may be individually urged upwardly at the desired force whereby an elongate member may be maintained in a horizontally disposed, rotatably balanced, non-deformed position.

Still another object of our invention is to supply an apparatus and method which is simple to use, is readily adjustable to the length and weight of any particular elongate member with a minimum of time and physical effort, and one adapted to be operated by an ordinary mechanic having little or no special training.

A still further object of our invention is to provide an apparatus that may be fabricated from standard commercially available materials, is relatively light in weight, occupies a minimum of floor space, is portable, does not require the installation of special footings or foundations for its support, and is not adversely effected by vibration to which it might be subject if the apparatus were installed near railroad tracks.

These and other objects and advantages of our invention will become apparent from the following description of a preferred form thereof, and from the drawings illustrating that form in which:

Figure 1 is a perspective view of our invention and a grinder installation, showing a crankshaft horizontally disposed in a rotatable position therein;

Figure 2 is an elevational view of the tail stock portion of the grinder illustrating the manner in which one end of the crankshaft is supported for eccentric rotation;

Figure 3 is an elevational view of the head stock portion of the grinder showing the eccentric mounting for the opposite end of the crankshaft;

Figure 4 is a combined vertical cross-sectional and side-elevational view of one of the vertically movable supports used in maintaining the elongate member disposed in the grinder in a non-distorted position;

Figure 5 is a perspective view of one of the supports adapted to rotatably engage the elongate member disposed in the grinder;

Figure 8 is an end elevational view of one of the hydraulic cylinder assemblies utilized in laterally reciprocating the rail from which the work supports depend;

Figure 9 is a vertical cross-sectional view of a hydraulic cylinder taken on the line 9—9 of Figure 8;

Figure 10 is a side elevational view of the combination air and hydraulic cylinder assembly that at all times maintains a predetermined pressure on the actuating hydraulic fluid of the invention;

Figure 11 is a vertical cross-sectional view of the combination air and hydraulic fluid cylinder shown in Figure 10, taken on the line 11—11 thereof;

Figure 12 is a diagrammatic plan of the air and hydraulic fluid piping system of our invention; and Figure 13 is a vertical cross-sectional view of an oversize crank pin, showing the detrimental effects resulting from grinding the piece when the longitudinal centerline thereof is angularly disposed.

Figures 6, 7:
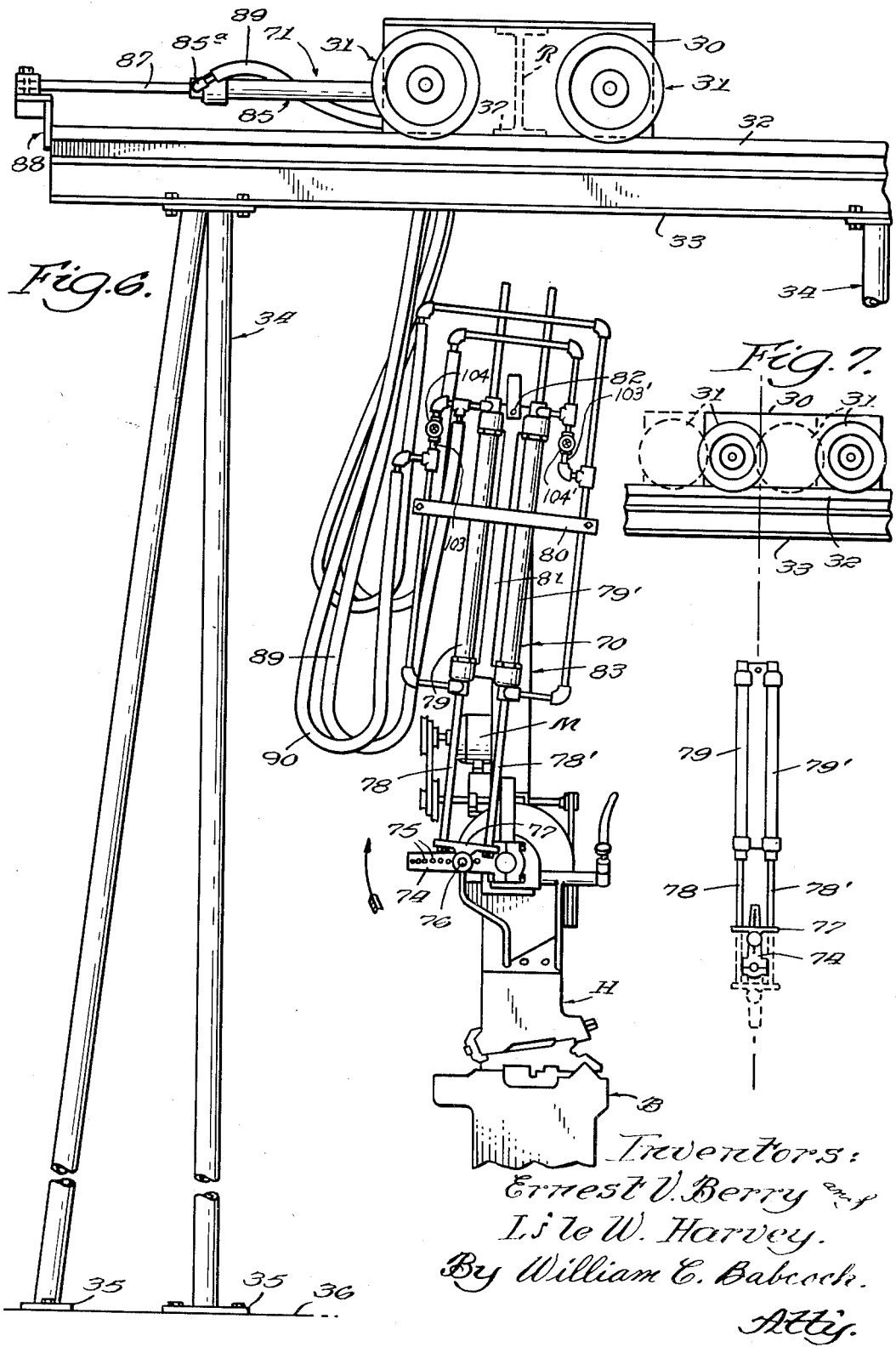
Figure 6 is an end elevational view of the head stock of the grinder, and the hydraulic equipment utilized in laterally reciprocating the rail from which the work supports depend.
Figure 7 is a diagrammatic end elevational view of the invention as shown in Figure 6, showing in solid and phantom line the throw of the rail-supporting rollers responsible for lateral reciprocation of the work supports.

Referring now to the drawings, the general arrangement of our invention may be seen in Figure 1, and it will be noted that this apparatus is illustrated in the drawings as employed in the grinding of oversize crank pins P on a crankshaft S to the desired transverse diameter. However, it will hereinafter become apparent that our invention is by no means limited to simply supporting a crankshaft in a horizontally disposed, rotatably balanced, non-distorted position, but that it may be used equally well in the support of other heavy elongate members such as calender rolls to permit machining thereof. It should also be noted that the crankshaft S, or other elongate member to be worked, may be either new or used.

We have found it desirable to use our work-supporting invention in conjunction with a grinder such as the device manufactured and sold by the Van Norman Company of Springfield, Massachusetts. For the purpose of clarification herein, these devices are identified as the Van Norman Company Crankshaft Regrinders, Model No. 111, No. 111–EL24, and No. 111–EL30.

In Figure 1 it will be seen that the above-identified grinder apparatus includes an elongated bed B on which a tail stock T and head stock H are slidably mounted, and that said head and tail stocks may be longitudinally adjusted relative to one another for the length of the particular crankshaft or other elongate member to be disposed therebetween. A carriage C is also mounted on bed B, and disposed between tail stock T and head stock H, which carriage is longitudinally movable on bed B by power means (not shown). A power-driven grinding wheel W is supported from carriage C which may be laterally adjusted thereon by means not shown in detail.

Tail stock T and head stock H rotatably support chucks 10 and 10a respectively, identical in construction. Each chuck is normally disposed and rigidly affixed to a heavy rectangular member 11 by a tongue and groove, or like construction (not shown). Member 11 is slidably and adjustably supported from a second heavy rectangular member 12, which member 12 is vertically disposed and rotatably supported from the head stock H and tail stock T (Figure 1). Each set of members 11 and 12 is provided with indexing means (not shown) for indicating the distance the center of the particular chuck 10 or 10a is vertically displaced from the horizontal centerline passing longitudinally through the centers of rotation of members 12 on the head stock H and tail stock T.

To grind or otherwise remove excess material from the crank pins P of crankshaft S when disposed as shown in Figure 1, it is necessary that all crank pins lying in the same plane on the crankshaft rotate on a fixed common axis extending longitudinally through the centers thereof. Positioning of crankshaft S between head stock H and tail stock T to cause rotation of crank pins P about a fixed axis is achieved by disposing the longitudinal centerlines of the pins in a plane parallel to that in which the members 11 may be slidably moved. With the crank pins P and members 11 so disposed, the chucks 10 and 10a may be adjusted to displace the centers thereof from the horizontal centerline extending through the centers of rotation of members 12 by a distance equalling one-half the stroke of the crankshaft. For the sake of clarity, the words "stroke" and "throw" when used herein refer to the maximum vertical distance a crank pin moves when the crankshaft of which it forms a part completes one revolution. Thus, the ends of crankshaft S rotate eccentrically relative to the center of rotation of members 12, but all of those crank pins P lying in the same plane on crankshaft S rotate on a fixed horizontal axis passing through said centers of rotation. With the workpiece so arranged on the apparatus of our invention, the grinding operation may then proceed by use of the grinding wheel W. As the crank pins are ground, the crankshaft S is rotated at the desired speed by means of a motor M geared to rotate member 12 mounted on the head stock H.

To fully appreciate the novelty of our invention, it must be borne in mind that the off-centered chucks 10 and 10a merely serve to guide and rotate the ends of the crankshaft S through a circular path during the time the crank pins P thereof are being ground. Substantially the entire weight of the crankshaft S, during rotation thereof, is borne by a number of work-supporting members that rotatably engage the main journals of the crankshaft. Due to the particular design and structure of the crankshaft S, it inherently lends itself to balanced rotation about a longitudinal axis extending through the main bearings thereof, which axis would extend through the center of chucks 10 and 10a when they are off-centered one-half the stroke or throw of the crankshaft, as shown in Figure 3. Each of the work supports, the structural details of which will be hereinafter described, is urged upwardly with a force sufficient to float the crankshaft in mid-air in a horizontally disposed position, whereby the crankshaft is not only supported in a non-distorted position, but one in which it is rotatably balanced. When the crankshaft is then rotated on a fixed horizontal axis, the crank pins thereof may then be ground to a true cylindrical configuration of an accuracy and precision far surpassing that obtainable by means of previously available apparatus or methods.

It will be apparent that our apparatus operates in direct contrast to any former apparatus employed in this field. With prior apparatus, a long, heavy crankshaft S is horizontally supported in an off-center position between the throwheads of a head stock and a tail stock. The throwheads are drastically unbalanced when thus supporting a crankshaft, and heavy counterweights must be mounted thereon in an attempt to bring them and the supported crankshaft into rotational balance. In addition, due to the weight of the crankshaft, it deforms downwardly, causing the longitudinal axis of the crank pins to assume angular positions rather than remaining in a fixed position. The combination of a crankshaft that tends to deform downwardly when it is supported in an inherently unbalanced rotatable position, presents a situation wherein it is practically impossible to grind the crank pins thereof to a true cylindrical configuration.

The difficulties experienced in grinding a crank pin when the crankshaft is thus supported may be clearly seen in the grossly exaggerated vertical cross-sectional view of Figure 13. In this view the crank pin P is oversize, having a layer of metal in the form of a cylindrical shell 23 deposited on the exterior thereof, the outer boundaries of which layer are indicated by phantom line. The crankshaft S has deformed to the extent that the normally horizontal longitudinal axis 21 of the crank pin has moved through a vertical angle A to occupy the angular position indicated by the numeral 21'. Should the grinding wheel W that has a true horizontal face 24 be brought into contact with the shell 23, the portion of the shell removed would have a triangularly-shaped cross-section, identified by the numeral 25. The pin P resulting from such grinding conditions is not a true cylinder, but instead assumes the configuration of a truncated cone having an outer longitudinally extending tapered surface 26. The longitudinally extending outer portion of the cone is the layer 27 of deposited metal that has not been ground off, which for clarity herein is shown by cross-hatching in Figure 13.

It will be obvious that crank pins ground in the faulty manner above described will not operate satisfactorily when rotatably engaging the surfaces of the bearings of connecting rods. The use of our invention eliminates the possibility of the crank pins or main journals of a crankshaft assuming a non-cylindrical shape when ground or machined.

The apparatus of our invention which permits the grinding of true cylindrical crank pins and main journals includes an elongate supporting rail R which is horizontally disposed above the head stock H and tail stock T. This rail R may take various forms, but we have found it convenient to employ a heavy I-beam that does not appreciably deflect when subjected to supporting the heaviest of crankshafts S that can be machined by the particular grinder assembly associated therewith. As best seen in Figures 1 and 6, rail R has two transversely disposed end pieces 30 welded or otherwise affixed thereto. Each end piece 30 has two longitudinally spaced grooved rollers 31 rotatably supported therefrom, which rollers movably rest upon two parallel tracks 32. Tracks 32 are disposed at opposite ends of the rail R, resting on and rigidly affixed to the upwardly disposed flanges of two transversely disposed cross pieces 33. Each cross piece 33 is supported in the desired position by two standards 34 affixed to the lower end portions thereof, extending downwardly to pads 35 that rest on the floor 36. Standards 34 may conveniently be fabricated from pipe in the form of tripods, as shown in Figure 1.

The I-beam constituting rail R has a flange 37 extending along the lower portion thereof. A number of inverted U-shaped hangers 38 are provided, each of which rotatably supports two opposed rollers 39 from the upper portions thereof, which rollers movably engage the upper surface of flange 37. Hangers 38 may be maintained in the desired spaced relationship by a longitudinally extending rod 40 affixed thereto. The rod has a number of longitudinally spaced, vertically disposed supporting members extending downwardly therefrom. A number of inverted U-shaped supports are provided, each formed with two laterally spaced legs 42 that are connected by a web 42a. The legs 42 have two parallel air cylinders 43 depending downwardly therefrom and transversely disposed to the longitudinal axis of rail R. Should it be desired, a single air cylinder of larger capacity may be substituted for the two cylinders 43. The air cylinders 43 are provided with customary pistons (not shown) connected to piston rods 44, with the piston rods 44 projecting downwardly through suitable packing means supported on the lower end portions of said cylinders. Two downwardly and outwardly extending connecting members 46, between which a work support 47 extends at the lower ends thereof, are pivotally supported on their upper end portions from rod 45.

Work support 47 rotatably engages one of the main journals of the crankshaft S when it is supported in the apparatus of our invention as disclosed in Figures 1 and 5. The support 47 comprises a rectangularly-shaped frame 48 which supports two longitudinally spaced, transversely disposed shafts 49, and each shaft rotatably mounts a pair of rollers 50. The end portions of frame 48 are provided with pins 48a that extend through openings 52 formed in the lower portions of connecting members 46 to maintain support 47 beneath one of the main crankshaft journals 53. By applying air under pressure to one pair of cylinders 43, a particular support 47 may be urged upwardly with the desired force, which force is transmitted to journal 53 through the rollers 50 that are in rolling contact with the lower surface thereof.

Each pair of air cylinders 43, which for convenience are further identified specifically by numerals 43a, 43b and 43c, are supplied with air under pressure through suitable tubes 54a, 54b, and 54c, respectively. Tubes 54a, 54b, and 54c extend to and are in communication with relatively large air reservoirs 55a, 55b, and 55c as may best be seen in Figure 12. Each reservoir 55a, 55b, and 55c has an air inlet pipe 56a, 56b, and 56c connected thereto, which pipes in turn are connected to air pressure reducing valves 57a, 57b, and 57c, respectively. Pressure reducing valves 57a, 57b, and 57c are connected by suitable pipe fittings to a common header 58, which header extends to a source of compressed air (not shown) at a higher pressure than that which at any time will be needed in the air cylinders 43.

The air pressure reducing valves 57a, 57b, and 57c may be adjustably set to deliver air at the desired pressure to the reservoirs with which they are associated. The air pressures in the reservoirs 55a, 55b, and 55c are visibly indicated at all times by air gauges 59a, 59b, and 59c, respectively. Each of the tubes 54a, 54b, and 54c supplying air under pressure to the cylinders 43 preferably is supplied with shut-off valves 59aa, 59bb, and 59cc, respectively, to permit replacement of the air cylinders 43 or allow for maintenance work to be done on them without discharging the air under pressure in the reservoirs. Bleeder valves V are provided on the lower ends of cylinders 43a, 43b, and 43c to permit discharge of air therefrom. By opening valves V when the shut-off valves 59aa, 59bb, and 59cc are closed, the work supports 47 may be easily lowered.

It will be apparent that for the crankshaft S to be maintained in a non-distorted, rotatably balanced position when supported as shown in Figure 1, the supports 47 must at all times be urged upwardly with constant forces of such magnitude that they compensate for counter forces on the crankshaft tending to deform same. These counter forces include the weight of the crankshaft itself, as well as centrifugal forces generated during rotation thereof. The particular upward force that must be applied to each of the supports 47 is easily and quickly achieved by adjusting the air pressures on the reservoirs 55a, 55b, and 55c. Although only sufficient air is admitted by the pressure reducing valves 57a, 57b, and 57c into the reservoirs 55a, 55b, and 55c respectively, to hold the air therein at a predetermined pressure, the air pressure in the cylinders 43a, 43b, and 43c actually varies slightly as the crankshaft S rotates. Variation in the air pressure in cylinders 43 is therefore reflected in the variation of force urging supports 47 upwardly. This variation of pressures in the air cylinders, were it of sufficient magnitude, would permit a deformation of the crankshaft S that would prevent uniform grinding of the crank pins P to a true cylindrical configuration.

The variation in air pressure in cylinders 43a, 43b, and 43c is brought about by the movement of supports 47. The supports are at all times in contact with the main journals 53 of crankshaft S as it rotates, and these main journals rotate through a circular path having a vertical throw identical to that the crank pins of the shaft would make under normal conditions. Therefore, the total volume for air in cylinders 43a, 43b and 43c will vary as the supports 47 associated therewith move vertically. Air volume in these three pairs of cylinders would be at its minimum when the supports 47 associated therewith are at their lowest point, and the volume at its maximum when the supports 47 are at the top of their stroke. As the pressure of a fixed volume of air varies inversely with the size of the space in which it is confined, the upward pressure on the support 47a is greatest when it is at its lowest point in following journal 53. The same situation also prevails for supports 47b and 47c.

This variation of air pressure in the cylinders 43a, 43b, and 43c is nullified by providing air reservoirs 55a, 55b, and 55c of relatively large capacity therefor. Thus, the capacity of each air reservoir is sufficiently great in comparison to the air cylinder associated therewith that the varying volume of air in the cylinder only slightly affects the upward force exerted by one of the supports 47. Precautions are taken in determining the capacities of reservoirs 55a, 55b, and 55c relative to air cylinders 43a, 43b, and 43c that no variation in air pressure will occur as crankshaft S rotates that would cause downward deformation thereof to an extent greater than the tolerances to which the crank pins P are being ground.

In order to maintain the crankshaft S in a non-deformed rotatably balanced position, it is not only essential that the upward forces on the supports 47 be constant to the degree above-described, but that these forces be exerted in a uniform upward direction on the supports at all times. Each support 47, as may be seen in Figure 4, cradles one of the main journals 53, with the upward force on the journal being exerted by rollers 50 that are equally off-set from a vertical centerline 60. Centerline 60 passes through the center of journal 53 between the air cylinders 43, and is in alignment with the vertical axis 61 of rail R.

Upwardly directed forces are maintained on journals 53 by laterally reciprocating the rail R in synchronism with the rotation of crankshaft S. Synchronism of lateral movement of rail R with the rotation of crankshaft S is also so arranged that the centerline 60 and vertical axis 61 are normally at all times in the same vertical plane with the center of journal 53 as it moves through a circular path. However, if it is found that the speed of rotation of the crankshaft is such that the main journals generate a distorting centrifugal force, this force may be overcome by adjusting the reciprocal throw of the rail R to less than that of the main journals. Thus, an upward and inward force may be applied to each main journal as it rotates, and this force is sufficient to overcome any distorting centrifugal force generated by the crankshaft as it rotates.

The concurrent reciprocation of the rail R with rotation of the crankshaft S is preferably effected by a hydraulic mechanism having two separate parts 70 and 71, the details of which are shown in Figures 3, 6, 7, 8, 9, 10, and 11. Head stock H, as may best be seen in Figure 3, has a horizontally positioned shaft 72 projecting from the side thereof opposite that on which crankshaft S is supported. By means of a drive mechanism 73 not shown in detail, shaft 72 is rotated by motor M in synchronism with the member 12 supported from the head stock H. A vertically disposed arm 74 is mounted on shaft 72, and the arm 74 has a number of longitudinally spaced bores 75 formed therein, which bores are adapted to receive a pin 76. When a pin 76 is disposed in one of the bores 75, it pivotally engages a cross bar 77 rigidly connected to the lower ends of two parallel piston rods 78 and 78'. These two piston rods extend upwardly into two hydraulic cylinders 79 and 79' and are connected to pistons (not shown) slidably mounted within the confines thereof. Cylinders 79 and 79' are held in fixed parallel relationship with one another by a centrally disposed cross member 81. The member 81 is pivotally supported on a horizontally disposed pin 82 mounted on the upper portion of a frame 83. The frame 83 which may take any one of a number of forms, extends upwardly above the headstock H, and is preferably affixed to the upper portion thereof.

The hydraulic assembly 70 shown in Figure 6 reciprocates the rail R. To use the assembly 70 for this purpose, the pin 76 is positioned in the appropriate bore 75 whereby the pistons affixed to the piston rods 78 and 78' reciprocate in the cylinders 79 and 79' respectively. Piston rods 78 and 78' are normally moved with the same vertical throw as that of the crank pins P.

In Figure 8 will be seen that the end portion of rail R above head stock H is provided with a horizontally disposed hydraulic cylinder 85, and cylinder 85 has a piston 86 slidably mounted therein connected to a piston rod 87 as shown in Figure 9. The extreme outer end of piston rod 87 is connected to a lug 88 extending upwardly from one of the rails 32. Cylinder 85 is rigidly affixed to the end piece 30 disposed above head stock H.

Cylinder 79 has fluid connections 79a and 79b at the upper and lower extremities thereof, and cylinder 85 has fluid connections 85a and 85b at the end portions thereof. A tubular member 89 extends between connections 79a and 85a, another tubular member 90 maintains fluid communication between connections 79b and 85b. Rotation of the arm 74 results in discharge of hydraulic fluid into cylinder 85, first through connection 85a and then through connection 85b to cause reciprocation of the cylinder and the rail R relative to the piston 86.

Lateral reciprocation of the rail R is best accomplished by imparting this motion to both ends thereof. For this purpose the hydraulic cylinder 79' is likewise provided with fluid connections 79" and 79'" from which tubular members 89' and 90' respectively, extend to a hydraulic cylinder 85' that is identical in construction to cylinder 85. Cylinder 85' and piston rod 87' associated therewith are mounted on the end piece 30 disposed above tail stock T. The cylinder 85' and piston rod 87' when supplied with hydraulic fluid from cylinder 79', serve to move the end piece 30 above tail stock T concurrently with the movement of end piece 30 above head stock H. Hydraulic cylinders 79' and 85', and the tubular members 89' and 90' constitute a closed hydraulic system completely filled with fluid.

As the rail R reciprocates laterally in synchronism with the rotation of the crankshaft S due to movement of hydraulic fluid in the two previously described closed systems, it is essential that the elements comprising these systems be completely filled with fluid at all times to eliminate waste motion and preclude the possibility of the rail R and crankshaft S getting out of phase.

To achieve this end, the air-actuated device shown in Figures 10 and 11 is provided. The device includes an intermediately positioned tubular member 92 from the ends of which two axially aligned cylinders 93 and 93' extend. Cylinders 93 and 93' are of identical construction, and have pistons 94 and 94' respectively, slidably mounted within the confines thereof, which pistons are provided with piston rods 95 and 95' that serve to slidably maintain them in cylinders 93 and 93'.

As shown in Figure 11, pistons 94 and 94' serve to define compartments 94a, 94b, and 94aa and 94bb in cylinders 93 and 93' respectively, which compartments vary in cubic content as the positions of the pistons change in the cylinders. The outer extremities of the cylinders 93 and 93' are formed with air inlets 93a and 93aa respectively, which are connected by tubular members 96 and 96' extending to a tubular T 97, or other suitable fitting connected to air header 58. As the header 58 at all times supplies air under pressure, the pistons 94 and 94' are constantly urged inwardly toward one another with a force proportional to said pressure, and tend to reduce the volume of compartments 94b and 94bb.

The inwardly disposed extremities of cylinders 93 and 93' are formed with bores 93b and 93bb through which hydraulic fluid may flow. Bore 93b has a tubular member 98 extending therefrom to a T connection 99 in tubular member 90. Bore 93bb is likewise connected by a tubular member 98' extending to a T connection 100 in tubular member 89'.

By use of the above described device shown in Figures 10, 11 and 12, the first closed hydraulic circuit that includes cylinders 79, 85 and tubular members 89 and 90, as well as the second circuit comprising cylinders 79', 85' and tubular members 89' and 90', are at all times completely filled with hydraulic fluid. The hydraulic fluid in both the first and second hydraulic circuits is maintained at a predetermined constant pressure in direct ratio to the air pressure in compartments 94a and 94aa.

In Figure 6 it will be seen that hydraulic fluid may be by-passed between the lower and upper ends of each of the cylinders 79 and 79' through tubular members 103 and 103' respectively. Tubular members 103, 103' are provided with valves 104 and 104' respectively.

The use of our invention is extremely simple. Head stock H and tail stock T are longitudinally adjusted on bed B in order that the crankshaft S may have the ends thereof engaged by the chucks 10 and 10a. Members 11, when crank pins are to be ground, are adjusted relative to members 12 to have the centers of chucks 10 and 10a, as well as the longitudinal axis of the end portions of crankshaft S disposed from the center of rotation of the members 12 by a distance equal to one-half of the throw of the crank pins P.

Rollers 39 are moved along rail R to position the work supports 47 under the main journals 53 of the crankshaft. Each of the supports 47 is then urged upwardly by the use of air pressure as previously explained, to float the crankshaft in mid-air, with substantially the entire weight of the crankshaft borne by the work supports. The chucks 10 and 10a merely serve as guides to rotate the ends of crankshaft S through the desired annular path, and are not relied upon to support the crankshaft. The proper upward force required on any one of the work supports 47 is simply and easily achieved by adjusting the particular one of pressure-reducing valves 57a, 57b, or 57c controlling the air pressure of cylinders 43a, 43b, or 43c associated with that particular support.

It is, of course, highly desirable that rail R laterally reciprocate such equal distances on each side of the longitudinal centerline of crankshaft S that the supports 43 may be urged upwardly in a uniform direction at all times. To this end the vertical center line of rail R is first disposed in the same vertical plane as that passing through the centers of rotation of the members 12. Lateral movement of the rail R to this position may be easily made when the by-pass valves 104 and 104′ are placed in the open position.

At this point our invention is ready for operation. The manner in which the air and hydraulic systems shown in Figures 6 to 12 inclusive maintain the work supports 43 in positions whereby crankshaft S is at all times rotatably balanced and non-deformed has previously been described in detail and need not be repeated.

Our invention is not restricted to the grinding of crank pins, but may be used equally well in the grinding of the main journals of the crankshaft. When the main journals are ground, the crankshaft S is maintained in a rotatably balanced non-deformed position by the supports 47 engaging all of the main journals except those on which the grinding operation is being performed. Of course, when the main journals are being ground, the chucks 10 and 10a are not off-set from the center of rotation of the members 11 and 12, nor is the rail R laterally reciprocated. In addition to using our invention for the grinding of main journals, it may also be used to grind such heavy elongated members as calender rolls to a true cylindrical shape.

Although the form of our invention herein shown and described is fully capable of achieving the objects and providing the advantages hereinbefore mentioned, it is to be understood that it is merely illustrative of the presently preferred embodiment thereof, and that we do not mean to be limited to the details of construction and operation thereof other than as defined by the appended claims.

We claim:

1. The method of forming a true cylindrical surface on a portion of a deformable member which is eccentrically located with respect to another portion thereof, and which comprises: disposing said member in a horizontal position between means for rotating said member at a desired speed and to which means said member is removably attached and also disposing said member in such a manner as to position the part to be formed, coaxially with said means for rotating said member, positioning at least one vertically movable support in rotational contact with the under side of a portion of said member which is eccentric to the axis of the part that is to be formed, applying an upward force to said support of such magnitude that substantially the entire weight of said member is borne by said support, and said member is maintained in a nondeformed and rotatably balanced condition as it rotates, generating said upward force by fluid introduced under pressure into a confined space of variable volume, with the magnitude of said force decreasing in proportion to the increase in quantity of said fluid in said space, supplying said fluid to said first confined space from a second confined space sufficiently large in size proportionate to said first space that any vertical movement of said support will not cause variation in said upward force sufficient to permit said member to deform beyond the tolerance to which it is desired to form said cylindrical surface; and forming said cylindrical surface as said member rotates.

2. The method of forming a true cylindrical surface on a portion of a deformable member which is eccentrically located with respect to another portion thereof, and which comprises: disposing said member in a horizontal position between guide means to rotate said member at a desired speed and to which means said member is removably attached and also disposing said member in such a manner as to position the part to be formed, coaxially with said means for rotating said member, disposing at least one vertically movable support in rotational contact with the under side of a portion of said member which is eccentric to the axis of the part that is to be formed, applying an upward force to said support of such magnitude that substantially the entire weight of said member is borne by said support to float said member in mid-air in a non-deformed and rotatably balanced condition, generating said upward force by air under pressure in a first confined space of variable volume, with the magnitude of said force decreasing in proportion to the increase in size of said space, supplying said air to said first confined space from a second confined space sufficiently large in size in comparsion to said first space that any vertical movement of said support will not cause variation of said upward force sufficient to permit said member to deform beyond the tolerance to which it is desired to form said surface, and forming said cylindrical surface as said member rotates.

3. The method of grinding a crank pin to a true cylindrical shape on a crankshaft that sags when supported only at its ends which comprises: disposing said crankshaft in a horizontal position between guide means for eccentrically rotating the ends thereof through an annular path having a radius that is one-half the throw of the crank pins of said crankshaft and to which means said crankshaft is removably attached, and also disposing at least one vertically and laterally movable support under a main journal of said crankshaft; applying an upward force to said support of such magnitude that said support bears substantially the entire weight of said crankshaft and floats it in mid-air in a non-deformed and rotatably balanced condition as it is rotated by said guide means; generating said upward force by fluid under pressure from a confined space sufficiently large in size that any vertical movement of said support will not cause variation in said upward force sufficient to permit said crankshaft to sag beyond the tolerance to which it is desired to grind said crank pin, and grinding said crank pin as said crankshaft rotates.

4. The method of forming crank pins having true longitudinally extending surfaces of constant cross-sectional diameters on a crankshaft of such length and weight that it deforms when supported from the ends thereof, which comprises: disposing said crankshaft in a horizontal position between guide means for eccentrically rotating the ends thereof through an annular path having a radius that is one-half the throw of the crank pins thereof, disposing at least one vertically movable support in rotational contact with one of the main journals of said crankshaft, applying an upward force to said support of such magnitude that substantially the entire weight of said crankshaft is held by said support, and said crankshaft is floated in mid-air in a non-deformed and rotatably balanced condition as it rotates; generating said upward force by fluid under pressure in a confined space, the volume of said space varying with the movement of said support, but said space being sufficiently large in size that any vertical movement of said support will not cause variation in said fluid pressure sufficient to alter said force to the extent that said crankshaft can deform beyond the tolerance to which it is desired to form said crank pins; maintaining said upward force in a substantially vertical direction at all times by concurrently reciprocating said support with the rotation of said crankshaft and normal to the longitudinal axis thereof, and forming said crank pins as said crankshaft rotates.

5. The method of grinding oversize crank pins on a deformable crankshaft to have true longitudinally extending cylindrical surfaces which comprises: disposing said crankshaft in a horizontal position between means for eccentrically rotating the ends thereof on a radius of rotation equal to one-half the throw of the crank pins of said crankshaft, disposing at least one vertically movable support in rotational contact with one of the main journals of said crankshaft, applying an upward force to said support of such magnitude that said support and said crankshaft are moved upwardly so as to maintain said crankshaft in a horizontal position as it rotates, generating said upward force by air pressure from a first confined space of variable volume that is connected to a second confined space sufficiently large in size relative to said support that any vertical movement of said support will not cause sufficient variation in said upward force to permit deformation of said crankshaft beyond the tolerance at which it is desired to finish said cylindrical surface, maintaining said upward force in a vertical direction at all times by laterally reciprocating said first confined space in synchronism with the rotation of said crankshaft, and grinding said crank pins as said crankshaft rotates until said pins assume the desired cylindrical shapes of constant cross-sectional diameters.

6. A device for maintaining a deformable elongate member in a horizontal rotatably balanced non-deformed position which comprises: a horizontally disposed track situated above said member and parallel thereto; a support that rotatably engages the under side of said member; a substantially vertically disposed hydraulic cylinder situated above said member; a piston slidably movable in said cylinder and connected to said support; means for introducing fluid under pressure into said cylinder below said piston and exert an upward force on said support of such magnitude that substantially the entire weight of said member is borne thereby; roller means mounted on said track which support said cylinder and permit said support to rotatably engage said member at the desired longitudinal position thereon; means that movably support said track for lateral movement relative to said member; and means for laterally reciprocating said track in synchronism with the rotation of said member to at all times maintain said cylinder in a substantially vertical plane.

7. A device for maintaining the crank pins of a deformable crankshaft on a horizontally disposed longitudinal axis during the machining thereof which includes: means for eccentrically rotating the ends of said crankshaft when said crankshaft is horizontally disposed on a radius of rotation that is one-half the throw of the crank pins of said crankshaft; a horizontally disposed rail situated above said rotatably supported crankshaft; roller means that may move longitudinally on said rail; means that movably support said rail for lateral movement relative to said rotatably supported crankshaft; a vertically disposed cylinder supported from said roller means; a piston slidably movable in said cylinder; a support which rotatably engages one of the main journals of said crankshaft; means connecting said support to said piston; tubular means through which fluid under pressure may be introduced into said cylinder to cause an upward force to be exerted on said support when engaging said main journal; means to control the pressure on said fluid in said cylinder to permit a force of sufficient magnitude to be exerted upwardly on said support that said crankshaft will not deform when horizontally disposed; means for supplying said fluid to said tubular means in sufficient quantity that vertical movement of said support during rotation of said crankshaft does not lessen the pressure on said fluid to the extent that said crankshaft will deform beyond the tolerance to which it is desired in order to machine said pins; and means actuated by the rotation of said crankshaft that laterally reciprocate said rail and at all times maintain said connecting means of said support in a substantially vertical plane whereby said support is urged upwardly in a uniform direction.

8. A supporting device for maintaining a deformable crankshaft in a rotatably balanced, non-deformed position whereby the crank pins thereof may be ground which includes: guide means that eccentrically rotate the ends of said crankshaft when said crankshaft is horizontally disposed on a radius of rotation that is one-half the throw of the crank pins on said crankshaft; longitudinally and laterally movable means disposed above said crankshaft; a support for rotatably engaging one of the main bearings of said crankshaft; a vertically disposed cylinder supported from said movable means; a piston slidably movable in said cylinder; means connecting said support to said piston; means for introducing fluid under pressure into said cylinder to cause an upward force to be exerted on said support when engaging said main bearing; means for controlling the pressure on said fluid in said cylinder to permit a force of sufficient magnitude to be exerted upwardly on said support that substantially the entire weight of said crankshaft may be borne by said support; means for maintaining pressure on said fluid between predetermined limits as said support moves vertically due to rotation of said shaft in regulating the maximum distortion to which said crankshaft may be subjected as it rotates; and hydraulic means actuated by power-driven means which are synchronized with the rotation of said crankshaft to laterally reciprocate said longitudinally movable means to at all times maintain a vertical upwardly directed force on said support.

9. A supporting device for maintaining a deformable crankshaft in a rotatably balanced position with the crank pins thereof maintained in fixed vertical and horizontal planes which includes: guide means that eccentrically rotate the ends of said crankshaft when it is horizontally disposed through an off-centered annular path that has a radius of rotation of one-half the throw of the crank pins on said crankshaft; longitudinally and laterally movable means disposed above said crankshaft; a support for rotatably engaging one of the main bearings of said crankshaft; a vertically movable member to which said support is connected; means supporting said vertically movable member from said movable means; power means, which when actuated, cause upward movement of said vertically movable member to the extent that said support bears substantially the entire weight of said crankshaft; and means that laterally reciprocate said movable means with the rotation of said crankshaft to so maintain said movable member that said support is urged upwardly in a substantially vertical direction at all times.

10. A supporting device for maintaining a deformable crankshaft in a rotatably balanced position with the crank pins thereof maintained in fixed vertical and horizontal planes which includes: guide means that eccentrically rotate the ends of said crankshaft when it is horizontally disposed through an off-centered annular path that has a radius of rotation one-half the throw of the crank pins of said crankshaft; longitudinally and laterally movable means above said crankshaft; a support for rotatably engaging one of the main journals of said crankshaft; a vertically movable member to which said support is connected; an air cylinder operatively associated with said member, said cylinder being supported in a vertical position from said movable means, and said cylinder when supplied with air under pressure causing said member to be forcibly urged upwardly; means for constantly supplying air at the required pressure to said cylinder to cause said support to be urged upwardly with a force of sufficient magnitude that said support bears substantially the entire weight of said crankshaft; and means for laterally reciprocating said longitudinally movable means in synchronism with the rotation of said crankshaft to at all times urge said support upwardly in a substantially vertical direction.

11. A supporting device for maintaining a deformable crankshaft in a rotatably balanced position with the crank pins thereof maintained in fixed vertical and horizontal planes which includes: guide means that eccentrically rotate the ends of said crankshaft when it is horizontally disposed through an off-centered annular path to cause the crank pins thereof to rotate on a fixed horizontal axis; longitudinally and laterally movable means; a support for rotatably engaging one of the main journals of said crankshaft; a vertically movable member to which said support is connected; fluid actuated means operatively associated with said movable member to cause vertical movement thereof, said fluid actuated means being supported from said movable means; means for supplying fluid under a substantially constant pressure to said fluid actuated means to cause said support to be urged upwardly with sufficient force to bear substantially the entire weight of said crankshaft; and means that laterally reciprocate said longitudinally movable means in synchronism with the rotation of said crankshaft to at all times urge said support upwardly in a substantially vertical direction.

12. A supporting device for maintaining the crank pins of a deformable crankshaft in the same vertical and horizontal plane when the crankshaft is horizontally disposed which includes: guide means that eccentrically rotate the ends of said crankshaft when said crankshaft is horizontally disposed with a radius of rotation that is one-half the throw of the crank pins on said crankshaft; longitudinally and laterally movable means disposed above said crankshaft; a support that rotatably engages one of the main journals of said crankshaft; vertically movable power means supported from said movable means, and said power means connected to said support; means for actuating said power means to urge said support upwardly with sufficient force for substantially the entire weight of the crankshaft to be borne thereby; and means that laterally reciprocate said movable means in synchronism with the rotation of said crankshaft whereby said support is at all times urged upwardly in a substantially uniform direction.

13. The method of forming crank pins having true cylindrical surfaces on a crankshaft that is in rotatable balance when supported on the main bearings thereof but which sags when supported only from the ends thereof which comprises: floating said crankshaft in mid-air on a plurality of supports that extend under separate main bearings thereof, each of said supports being capable of independent vertical movements; moving each of said supports upwardly with a selected force of such intensity as to sustain said crankshaft in a non-distorted position and with the axes of the crank pins in a substantially horizontal line, said forces being applied to said supports in single vertical planes of such direction that it passes through the axes of said main bearings; rotating said crankshaft to cause the ends and main bearings thereof to describe in axially spaced vertical planes annular paths, having radii of one half the throw of said crankshaft; applying said selected forces to said supports as they rotate in said annular paths in the same direction and at the same intensities as when said crankshaft was initially disposed in said non-distorted position; and grinding said crank pins as said crankshaft rotates.

14. A method of forming true cylindrical surfaces on crank pins of a crankshaft that is in rotatable balance but is of such weight as to be subject to sagging when supported only by the ends thereof, comprising: disposing said crankshaft in a substantially horizontal plane between two longitudinally spaced, axially aligned, vertically rotatable members which removably engage and support the ends thereof; placing at least two laterally movable rotatable supports under said crankshaft main bearings that are disposed on opposite sides of at least one of said crank pins to be worked; rotating said crankshaft and causing the centers of the ends thereof to describe circular paths having a radius of one-half the throw of said crankshaft; applying independent upwardly directed forces of variable intensity to said supports; rotating said members at a substantially constant rate; varying the intensity of said forces until said supports are moved upwardly to the extent that the crank pins in that portion of said crankshaft situated therebetween are caused to revolve about an axis sufficiently parallel to the center of rotation of said members that true cylindrical surfaces may be formed on said crank pins within a required tolerance; maintaining the intensity of said forces as said crankshaft rotates within a critical range for each of said supports, the lower limit of said ranges being that force intensity at which downward distortion occurs in said crankshaft portion when said crankshaft is supported by the ends thereof, with the upper range limits being that force at which the centerline of said crankshaft portion is displaced out of alignment with the fixed center of rotation of said members, which distortion prevents formation of a true cylindrical surface within the required tolerance on the crank pins located on said crankshaft portion; and forming said crank pin surfaces as said crankshaft rotates.

15. A method of forming true cylindrical surfaces on crank pins of a crankshaft that is in rotatable balance but is of such weight as to be subject to sagging when supported by the ends only thereof, comprising: disposing a plurality of movable supports under the main bearings of said crankshaft; subjecting said supports to a plurality of independent upwardly directed forces of variable intensity; varying the intensity of each of said forces until said supports have raised to sustain the weight of said crankshaft and float same in mid-air in a horizontal, non-deformed, rotatably balanced position; rotating said crankshaft at a constant rate; moving said crankshaft supports in synchronism with said crankshaft as it rotates to the extent that the ends thereof describe circular paths having a radius of one-half the throw of said crankshaft; maintaining said intensity of said force during crankshaft rotation at a magnitude substantially that exerted when said crankshaft was initially disposed in said horizontal non-distorted position; and forming said crank pins as said crankshaft rotates.

16. An apparatus for use in so rotatably supporting a rotatably balanced crankshaft which is of such weight as to be subject to sagging when supported by the ends only thereof that the crank pins associated therewith revolve on a fixed common axis, including: a plurality of supports that are so spaced to permit each of said supports to engage one of the main bearings of said crankshaft; a plurality of vertically movable, independently operable, fluid-actuated lifting means, each of which means is operatively connected to one of said supports; means for supplying fluid to each of said lifting means in such volume and at a pressure sufficient to raise said supports to positions where said crankshaft is horizontally disposed in a non-distorted rotatably balanced condition, and to so continue supplying said fluid at such volume and pressure during crankshaft rotation that said crankshaft remains in horizontal non-distorted balance; means to rotate said crankshaft at a uniform rate; and means for laterally reciprocating said supports and fluid-actuated means in synchronism with crankshaft rotation to cause the crankshaft ends to describe annular paths having a radius of one-half the throw of said crankshaft, with said pins revolving about said common axis.

17. An apparatus for use in so rotatably supporting a rotatably balanced crankshaft which is of such weight as to be subject to sagging when supported by the ends only thereof that the crank pins associated therewith revolve on a fixed common axis, including: a plurality of supports that rotatably engage the undersides of the main bearings of said crankshaft; a plurality of hydraulic cylinders; a plurality of pistons slidably mounted in said cylinders, each of which pistons is connected to one of said supports; means for introducing fluid under pressure into each of said cylinders below said pistons; means for supplying fluid to each of said fluid introduction means under such pressure as to move said supports upwardly to support said crankshaft in a horizontally balanced, non-distorted position; means to rotate said crankshaft when so disposed; and means for laterally reciprocating said cylinders in synchronism with said crankshaft rotation to cause the ends of said crankshaft to describe annular paths having a radius of one-half the throw thereof and to cause said crank pins being worked to revolve about a common fixed axis.

18. In a device for grinding pins of a crankshaft, means to laterally and reciprocally move a support suspension for a main bearing of said crankshaft in a constant vertical plane as said crankshaft revolves about a horizontal axis through a portion of the crank pins associated therewith: means to rotate said crankshaft about said axis whereby the axis of a main bearing of said crankshaft describes a circle; a horizontal rail paralleling said axis above the maximum upper position reached by said main bearing during rotation of said crankshaft; supporting means mounted on said rail to which said suspension is affixed; means to reciprocate said rail as said crankshaft rotates which includes transversely movable means mounted on the ends of said rail; transversely disposed track means mounted under said rail ends on which said movable means are mounted; drive means that describe a predetermined pattern with each rotation of said crankshaft; means for reciprocally moving said movable means when actuated by said drive means in synchronism with the lateral movement of said main bearing, which movable means occupies a fixed position on said track means for each point in said predetermined pattern; and means that permit relative adjustment between the degree of movement of said drive means and said means which reciprocally move said movable means to accommodate crankshafts of varying size.

19. A device as defined in claim 18 in which said supporting means is a roller that rotatably engages said rail, and is adapted to have a vertical fluid cylinder suspended therefrom which controls vertical movement of said support.

20. A device as defined in claim 19 in which said transversely movable means are elongate rigid members that rotatably support a plurality of rollers, and said transversely disposed track means are tracks rigidly supported on the upper end portions of standards that extend downwardly therefrom to a supporting surface.

21. A device as defined in claim 20 in which said driving means is an arm having a fixed center of rotation, which arm is adjustable as to the radius of the circle described by said arm.

22. A device as defined in claim 21 in which said means that reciprocally move said movable means is constituted by a hydraulic cylinder having a piston mounted therein that is actuated by a piston rod connected to a point on said arm, the radius of rotation of which point is one-half the throw of said crankshaft, second hydraulic cylinders normally disposed to the ends of said members and having pistons mounted therein connected to fixed locations relative to said tracks, with a plurality of tubular fluid connections extending between said first cylinder and said second cylinders, with said connections being so arranged that when said arm is rotating upwardly fluid is discharged to said second cylinders to cause movement of said rail one-half the lateral distance traversed in each rotation of said crankshaft, said arm during downward rotation causing fluid discharge from said first cylinder to said second cylinders to move said rail the balance of the lateral distance traversed in each crankshaft rotation.

23. A device as defined in claim 22 in which a reservoir containing hydraulic fluid is provided that communicates with said tubular connections, which reservoir includes a piston, a piston-actuating means that maintain a greater pressure on said fluid than would be exerted on said fluid in said first and second hydraulic cylinders and said tubular connections in moving said rail to prevent entry of air thereinto and adversely affect synchronized movement between said rail and main bearing.

References Cited in the file of this patent

UNITED STATES PATENTS

| | | |
|---|---|---|
| 656,903 | Morgan | Aug. 28, 1900 |
| 1,700,721 | Groene | Jan. 29, 1929 |
| 1,875,486 | Peaslee | Sept. 6, 1932 |
| 1,961,091 | Smith | May 29, 1934 |
| 2,245,922 | Johnson | June 17, 1941 |

FOREIGN PATENTS

| | | |
|---|---|---|
| 567,711 | Germany | Jan. 7, 1933 |

OTHER REFERENCES

Publication "American Machinist Magazine," March 17, 1904, page 358.